United States Patent [19]

Pulvari

[11] 4,141,091

[45] Feb. 27, 1979

[54] AUTOMATED FLUSH SYSTEM

[76] Inventor: Charles F. Pulvari, 2014 Taylor St., NE., Washington, D.C. 20018

[21] Appl. No.: 749,426

[22] Filed: Dec. 10, 1976

[51] Int. Cl.² .................. E03D 1/00; E03D 5/10; G01S 9/66

[52] U.S. Cl. .................. 4/313; 4/DIG. 3; 340/3 D; 361/179

[58] Field of Search .......... 4/1, 10, 100, 166, DIG. 3, 4/300, 302, 38, 318, 405, 406, 313, 314; 340/1 R, 3 D, 258 A, 560; 361/179; 251/129

[56] References Cited

U.S. PATENT DOCUMENTS

| | | | |
|---|---|---|---|
| 2,056,087 | 9/1936 | Andrews | 4/DIG. 3 |
| 3,471,868 | 10/1969 | Zorn | 4/100 |
| 3,555,368 | 1/1971 | Atkins | 4/100 X |
| 3,725,888 | 4/1973 | Solomon | 340/3 D X |
| 3,863,196 | 1/1975 | Hilles | 340/1 R |
| 3,958,158 | 5/1976 | Dart | 4/DIG. 3 |
| 3,997,866 | 12/1976 | Taylor et al. | 340/3 D X |
| 4,016,528 | 4/1977 | Takeuchi | 340/3 D X |
| 4,032,822 | 6/1977 | Un | 4/DIG. 3 |

FOREIGN PATENT DOCUMENTS

| | | | |
|---|---|---|---|
| 2406382 | 8/1975 | Fed. Rep. of Germany | 4/DIG. 3 |
| 485653 | 10/1953 | Italy | 4/DIG. 3 |

*Primary Examiner*—Stuart S. Levy
*Attorney, Agent, or Firm*—Jim Zegeer

[57] ABSTRACT

There is disclosed an automated flush system which senses the approach and departure of an object or person and produces control signals indicative of said approach and departure, respectively. A discriminator unit receives and decodes the approach and departure signals to produce a flush control signal which controls a flush valve in the flush system as a result of the occurrence of the departure signal following the occurrence of the approach signal.

1 Claim, 7 Drawing Figures

AUTOMATED FLUSH SYSTEM

BACKGROUND OF THE INVENTION

Prior art flushing devices, such as for example toilet flushers were manually operated. However, these flushers could not very well operate by incapacitated individuals such as for example hospitalized patients. Some other people failed to flush the toilet either out of negligence or because the manual touch of the activating lever was hygienically undesirable. For these reasons it was recognized that an automatic flushing device would be of advantage. With the advent of optical proximity switches wall hang urinals were developed utilizing the interruption of a light beam for optically controlling flushing. These earlier automated flushers did not become popular because they operated on approach and splashed the liquid around at the time a person was close to the urinal. A simple time delay between the approach i.e. the interruption of light beam and flushing could not solve the problem properly for the same reason. Because of these shortcomings these early propositions for automating flushers of toilets did not materialize. The apparatus according to the present invention is a substantial improvement over prior art devices since it eliminates the above-mentioned undesirable features and excludes the need of manual operation, it also provides an automatic logic control circuit between the sensor switch and the electromechanically operated liquid dispenser or flusher, thereby making said apparatus responsive to perform a desired switching cycle. It also provides for the use of a modulated radiation which in a retro-reflective mode of operation permits to develop a compact unit, comprising all elements of the apparatus such as sensor, control circuit, electrically operated liquid dispenser and power supply. Such a single unit can be easily mounted either on an already existing liquid dispenser or toilet flusher. Said apparatus can also be united with the dispenser in a single self contained unit. This invention also provides an improved electrically operated liquid dispenser or flusher. Such an apparatus may advantageously be employed for example in chemical processing and a programmed flushing or precise additions of chemicals are needed, in such a case manual control could not properly perform. Generally in a great number of industrial applications, automatically and electrically controlled liquid dispensers could greatly enhance and improve production. Besides using light operated sensors they could be responsive to chemical substances and/or other physical parameters such as temperature, infrared mechanical motion, ultrasonic, electromagnetic radiation, etc.

SUMMARY OF THE INVENTION

The present invention provides a novel electromechanically operated flushing device which when energized by an appropriate electrical power, performs the flushing function, and can in fact replace the heretofore manually operated flushers, such as used in industrial applications, for example in chemical processing and for toilets in households. Furthermore, it provides an electrical switch for energizing and activating the electromechanically operated flusher, connected in a suitable solid state electric circuit, capable of performing some logic control functions, thereby making said switch responsive to perform a desired switching cycle. For example if a person or object approaches and later leaves a toilet the desired cycle of operation is to energize the toilet's actuator at the time the person leaves the toilet. Various types of switches are suitable for a non-manual operation, such as fast operated, pad switches or switches actuated by the seat covers of the toilets, or actuated by the opening and closing of a door. Contactless proximity switches provide the most ideal switching function. They utilize various physical principles such as magnetic, electrostatic, optical, electromagnetic and ultrasonic can all be utilized as sensors, for actuating an electrical switch which in turn energizes the electromechanical actuator. The electromechanical actuator could be either a linear or rotary-type. The former is generally known as an electromagnetic solenoid and the later could be for example an electromagnetically driven rotary device.

The apparatus for dispensing automatically liquids is comprised of three basic functional blocks: a proximity switch, a logic control circuit and an electromechanically operated liquid dispenser or flusher and provides a novel unit, replacing the heretofore manually or mechanically operated liquid dispensers thereby providing the required means for automated chemical processing and an increased comfort and hygiene for toilet flushers in public and in residential use. Although the completely automated modification of this invention is preferred, including a proximity sensor, logic control circuit and the electrically operated flushers, the electromechnically operated toilet has itself some significant advantageous uses operated only by a simple hand or fast switch. A programmed or centralized such switch could flush a large number of toilets. This may be of particular advantage in flushing toilets in a theater or school buildings. Another such case may be in industry where a number of flushers may need be switched according to a program required by the processing procedure.

The basic principle of operation is briefly explained as follows: the proximity switch at the input of the apparatus responds to approaching or departing objects or persons and produces a different signal on approach and on departure. The two signals could be different because they are derived from a leading or a trailing edge of a pulse, or from a charge and discharge cycle of a capacitor, or could be a difference in frequencies, derived from the doppler effect occuring when an emmitted and reflected radiation of a moving reflective object or person interferes. An electronic solid state logic control circuit selects one of the aforesaid signals and makes said proximity switch responsive to either an approach or a departure and finally energizes the electromechanically operated liquid dispenser or flasher in the appropriate time, which in case of a toilet is the time of departure.

In describing the various embodiments of this invention the terminology for the manually operated toilets accepted by the industry will be used with those modifications required in the process of automation, in which case of course the electrical engineering terminology has been adopted.

DESCRIPTION OF THE VARIOUS EMBODIMENTS

In the illustrated embodiments the elements of the electrically operated flushing unit, as well as the overall operation of the whole system are described. It should, of course, be understood that in each case these descriptions serve merely to present a clear understanding of the underlying technical details and principals of the automatically operating flushing device, and that various types of sensors, switches, automatic control circuits, and electro-mechanical transducers could equally well be utilized. The embodiments as described are merely for the purpose of illustration.

For the clarity of presentation, the basic elements of the automated flushing device are separately shown and described.

Figure 1A:
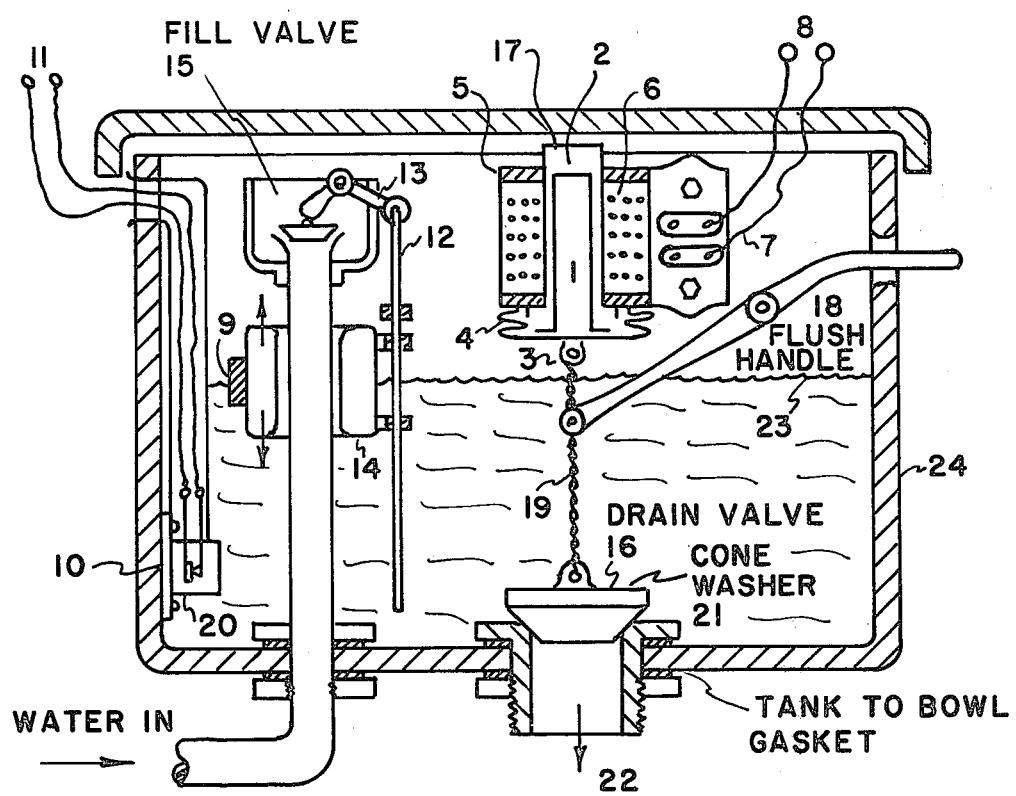
FIG. 1a is a schematic presentation of a manually and electrically operated toilet flusher.

FIG. 1a is a cross-section of a state of the art average type toilet tank. It includes a fill valve 15 a float 14 lever 13 and rod 12 controlling the water supply into the tank. If a flush operation depleted the toilet tank of water the fill valve 15 opens because the water level 23 sinks below the normal operating level and float 14 in its down state brings fill valve 15 in its open state through rod 12 and lever 13. Conversely as the toilet tank successively fills up, the water level 23 rises and as float 14 is sufficiently elevated it closes the fill valve 15 by the means of rod 12 and lever 13. A drain valve 16 serves to drain off water into the bowl 22 (not shown in FIG. 1a) for flushing its content, and can be manually operated by the flush handle 18. An overflow tube not shown in FIG. 1a connects the fill valve and drain. All this is conventional and well developed for manual service. Although according to this invention toilet flushers operating entirely automatically and electrically could be manufactured, it is felt that in order to maintain undisturbed operation an apparatus should manually as well as electrically be operated. Since the manually operated toilet flusher 24 or liquid dispenser is already well known no further details are presented.

Figure 2:
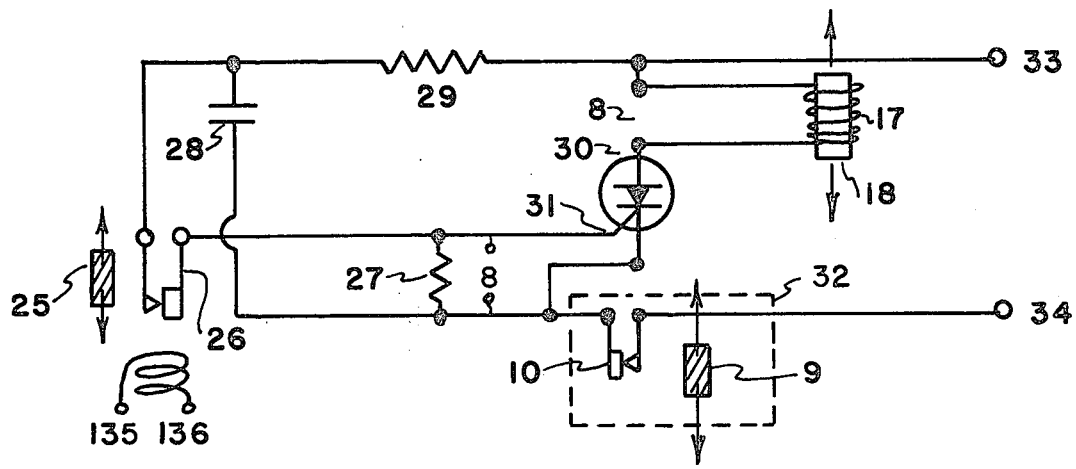
FIG. 2 exemplifies an automatic control circuit affording a predetermined switching and performance cycle
Figure 3:
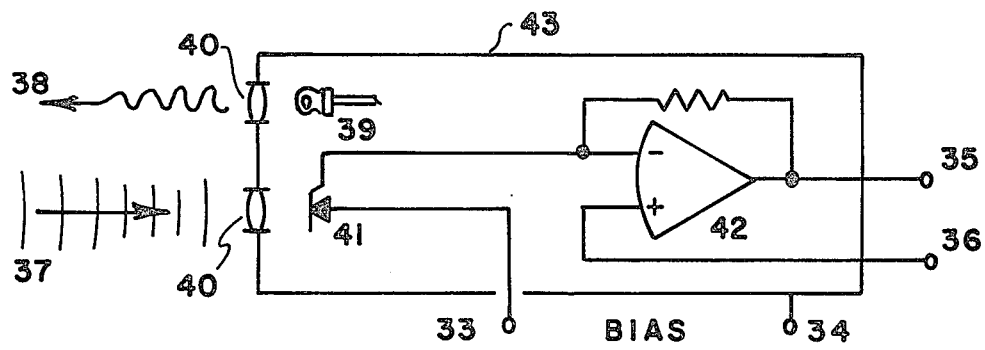
FIG. 3 presents again another modification of this invention utilizing an optically operated contactless proximity switch as an input sensor and switch.
Figure 4:
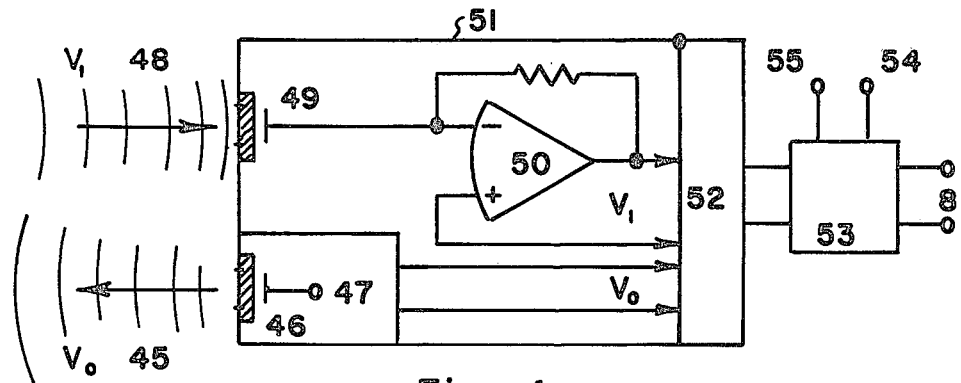
FIG. 4 shows a modification of this invention utilizing ultrasonic contactless proximity switch as an input sensor and switch.

The automated flushing unit is essentially an electromechanical system comprising three elements, the input sensor and/or switch 26, 43, 51 shown in FIGS. 2, 3, and 4, the electromechanical transducer or actuator 17 FIG. 1a and the input to the output connecting automatic control circuit. Since for less demanding purposes the electromechanically operated toilet flusher could be directly utilized with a simple manual or foot operated switch, in FIG. 1a an electrically operated linear actuator 17 is in combination with a toilet flusher shown and serves the same function as the flush handle 18. The reset switch 10 and magnet 9 terminate the energizing cycle of the actuator 17 and they work in cooperation with actuator 17. The linear actuator 17 shown in FIG. 16 is essentially an iron plunger 1 suspended in a movable manner within a coil 6 of magnetic wires. The whole assembly is hermetically sealed in order to protect the actuator against moisture and possible corrosion. Part of the seal is a metal bellow 4 which can be properly soldered in place and afford the plunger 1 to remain mobile. The bellow and the whole protective enclosure could be of other than metallic materials for example plastic enclosures and bellows, or of a rubber-like moulded structure. The plunger's suspension utilizing a bellow 4 permits it to move within the case 5 of the actuator comprising dampening means 2 at one end of the space within which the plunger moves in order to avoid shocks and/or vibrations. Actuator 17 is fixed to the toilet tank with the aid of screws or other means using holes. 7 The electrical connections 8 to the energizing coil 6 are also coated with moisture and chemically resistant protective material. Finally the movable end 3 of the plunger 1 is with a chain or wire 19 connected to the flush handle 18 and drain valve 16. If now the coil 6 is energized by the application of electrical current to the electrical connections 8, the plunger will move according to the polarity and current through the coil, and will open or close the drain valve 16 similar to the operation of the flush handle. 18.

After the drain valve 16 has been opened by actuator 17 and the time of draining proceeds, it becomes necessary to interrupt the energizing current of coil 6. This is accomplished by the reset switch 10 as float 14 lowers with drainage, the magnet 9 fixed on float 14, passes by switch 10 and opens the normally closed magnetic reed switch 10 which also is hermetically sealed in an enclosure 20. The result of this is that the energizing circuit is for a short time interrupted and this interruption switches off the conductivity of the silicon controlled rectifier or thyratron 30 (see FIG. 2) and coil 6 becomes deenergized.

A similar effect can also be obtained if the energizing current is automatically interrupted after the drainage time has been elapsed. This can be achieved with an all electronic time delay switch 32 inserted in the energizing circuit. The time delay switch 32 is symbolized by the dotted box around reed switch 10 an since such delay switches are well known it is not described here in detail. In this case switch 10 and magnet 9 shown in FIG. 1a can be omitted. In addition to actuator 17 and reset switch 10 there is a third important requirement, the timing of the actuator's 17 energization. It is important that as an operator or user approaches the toilet or its seats and the sensor switch 26 shown in FIG. 2 produces a signal due to the proximity or presence of the operator or magnet 25 this signal should not cause to energize the actuator 17 and only after said operator or user departs from the toilet seat, should actuator 17 be energized.

According to this invention this problem is solved by an automatic control circuit shown in FIG. 2 interconnecting the input sensor and/or switch 26 and magnet 25 with the electromechanical actuator 17.

Referring now to FIG. 2 the input sensor or switch is symbolized by a magnetic reed switch 26 and magnet 25. This switch could be either a mechanical contact switch or a proximity switch of any sort magnetic, electromagnetic (radio frequency) ultrasonic or optical switch. The magnetic reed switch can function in both configurations either as a mechanical or as a proximity switch and was for this reason chosen for illustration purposes. Switch 26 is normally closed and shorts out capacitor 28. Capacitor 28 is connected through a large resistor 29 to terminals 33 and 34 serving as connection to a power supply of a relatively low voltage in the order of about 24 volts. The applied voltage is in the permitted range for industrial use. Terminals 33 and 34 also connect to the terminals of the actuator 17 through a tyratron or silicon controlled rectifier 30. The power supply, the actuator 17 and S.C.R. 30 are in series and the actuator is only energized if and when the firing terminals 31 are energized. The firing and input terminal of the thyratron is connected to a resistor 27, which in turn is in series with capacitor 28 and switch 26. If now switch 26 is switched from its normally closed to open state either due to mechanical action such as the motion of the seat cover or the magnet fixed to the seat cover then capacitor 28 charges up slowly through the larger resistor 29. The low current flowing through the small resistor 27 could not trigger the thyratron 30. As long as the person uses the toilet, switch 26 remains open since either the magnet 25 or the mechanical pressure of the seat keeps it in this state. If however the person leaves the toilet the magnet 25 or the mechanical pressure from the seat is released and switch 26 returns in its normally closed state causing a discharge of capacitor 28 through the low resistor 27 in a small fraction of a second causing a sufficient large firing potential on this resistor, and now the actuator 17 becomes energized and the toilet becomes flushed. The role of switch 10, magnet 9 as well the dotted box 32 has been in connection with FIG. 1a earlier described and serve to de-energize the actuator 17. In summary the desired switching and operating cycle is obtained, the signal generated within the approaching period merely primes the circuit and prepares the circuit conditions for the departure period, when and only then the actuator becomes energized and the toilet bowl is flushed out. It is sometimes desirable that the actuator's energization should be delayed a few seconds—this can be accomplished by inserting a delay in the firing circuitry or by providing an adjustable cataract (dashpot) 2 in FIG. 1a which would slow down the response of activator (17).

Referring now to FIG. 3, modification of the invention is illustrated wherein a photoelectric proximity sensor and switch 43 is employed for performing the desired switching cycle and performance. The photoelectric proximity switch comprises a light source 39 and photodiode 41 with a field effect transistor as the front end of the operational amplifier 42. The light source produces a modulated light 38 in order to have a good daylight discrimination, and is projected forward through the lens 40. The reflected light 37 enters in the photodiode receiver 41 again, through lens 40 and signal appears on terminals 35 and 36. If the terminals 135 and 136 are connected to the source terminals 135 and 136 of a switch 26 in FIG. 2 and the signal is sufficiently large, it will actuate switch 26 and the performance of circuitry will be identical as it has already been described in connection with FIG. 2. Terminals 33 and 34 connect to a power supply. The proximity switch using modulated reflected light, responds to an approaching object from a distance of about five to eight feet.

Figure 1B:
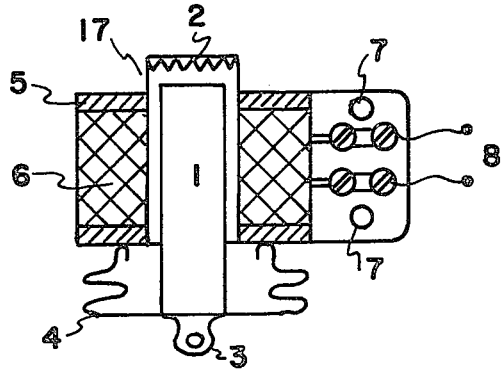
FIG. 1b illustrates a solenoid actuator for the flusher.

Referring now to FIG. 4, an electroacoustic proximity sensor and switch 51 is illustrated, and utilizes the doppler effect occurring when the ultrasonic radiation is reflected from a target or objects in motion. An electronic oscillator indicated by the numeral 47 drives a piezoelectric element 46 and generates acoustical waves 45, which are radiated forward as indicated by the arrow 45 with a frequency $\gamma_0$. The electronic oscillator 47 is built in an enclosure. If now an object approaches the sensor the reflected waves from the approaching object will be higher than the initially radiated frequency $\gamma_0$, conversely the reflected frequency from a departing object will be lower than $\gamma_0$. In this modification of the invention this frequency difference between an approaching and departing object is utilized for switching electrical energy to the actuator coil 6 via terminals 8 (See FIG. 1) during the departure cycle only and eliminate switching as well as flushing during approaches. As the piezoelectric element serving as an acoustic receiver senses the reflected waves 48 with the frequency $\gamma_1$ and are amplified by means of an operational amplifier 50 they are compared with $\gamma_0$ coming directly from oscillator 47 in the mixer 52. The so obtained output frequencies enter into a filter permitting only the passage of low frequencies. After filtering, the signals are detected and used directly for switching the silicon-controlled rectifier shown in FIG. 2. In this case switch 26 resistor 27 capacitor 28 and resistor 29 are omitted and the output signal at output terminals 8 is directly connected to the firing electrode 31 of S.C.R. 30. Instead of using an S.C.R. a light coupled solid state relay could also be directly switched and used for energizing the electromechanical actuator's terminals 8 as shown on the output of unit 53. Conversely the device will respond to an approach only if a high pass filter is employed. Terminals 54 and 55 are connected to the power supply. The acoustoelectric proximity switch detects moving objects from a distance of ten to fifteen feet. It is noted that instead of acoustical waves electromagnetic waves such as radio frequency radiation could also be utilized and produce similarly the doppler effect. Since the principle of such a radio frequency proximity sensor and switch works on the very same principle as the electroacoustic solution it is felt that a description of such a device can be ommitted.

Figure 5:
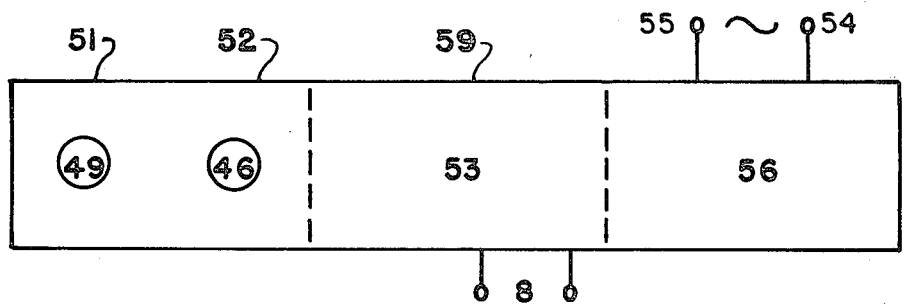
FIG. 5 is a block diagram presentation of the electrical system, automatically operating the flasher device.
Figure 6:
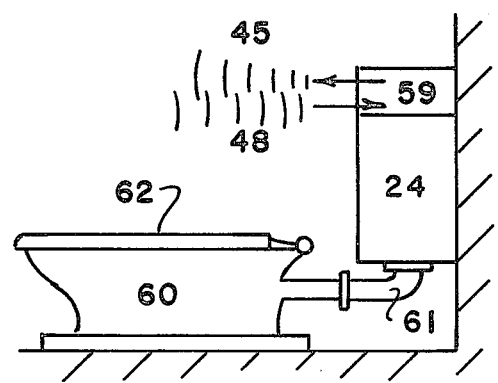
FIG. 6 is a schematic representation of a toilet comprising an automatic electric flusher.

Referring to FIG. 5 shows the whole operatus 59 as a unit including the proximity switch 51, the electronic control signal processors 52 and 53 and power supply 56. The unit connects to electrical power through terminals 58 and 57 and to the electromechanical actuator through terminals 8. The radiated ultrasonic waves 45 and reflected ultrasonic waves 48 are indicated in FIG. 6. FIG. 6 shows unit 59 mounted on the toilet bowl 60 with the seat cover 62.

It is apparent from the foregoing that there is provided according to the present invention new and novel automatic electric apparatus for dispensing liquids, suitable for industrial as well as residential use and is responsive to approaching or departing objects or persons and includes logic control means for ascertaining a desired cycle of operation, excluding the need of manual operation permitting programmed dispensing of liquids and non-mechanical sensing and response to actuate for example toilet flushers.

It is apparent from the foregoing that this invention may be embodied in several forms without departing from the spirit of essential characteristics thereof. The present embodiment is illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed:

1. In an automated flush system having an electrically controllable flush valve in the flush system and control means for controlling said flush valve, the improvement comprising:

sensing means including transmitting means for establishing a sensing field, for sensing the approach and departure motion of a user with respect said sensing means, receiving means for receiving reflected frequency shifted signals of said approaching and departing user, and signal processing means producing electrical control signals indicative of the approach and departure motion, respectively, of said user with respect to said sensing means, and a discrimination unit for receiving and decoding said approach and departure motion caused signals to produce a flush control signal for controlling said flush valve during the departure cycle only as a result of the occurrence of said departure motion signal.

* * * * *